(12) United States Patent
Grondin et al.

(10) Patent No.: US 9,672,272 B2
(45) Date of Patent: *Jun. 6, 2017

(54) METHOD, APPARATUS, AND COMPUTER-READABLE MEDIUM FOR EFFICIENTLY PERFORMING OPERATIONS ON DISTINCT DATA VALUES

(71) Applicant: Informatica LLC, Redwood City, CA (US)

(72) Inventors: Richard Grondin, Ste-Julie (CA); Evgueni Fadeitchev, Montreal (CA)

(73) Assignee: Informatica LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,418

(22) Filed: Nov. 16, 2015

(65) Prior Publication Data
US 2016/0070779 A1 Mar. 10, 2016

Related U.S. Application Data

(63) Continuation of application No. 13/835,590, filed on Mar. 15, 2013, now Pat. No. 9,218,379.

(51) Int. Cl.
*G06F 17/30* (2006.01)

(52) U.S. Cl.
CPC .. *G06F 17/30598* (2013.01); *G06F 17/30315* (2013.01); *G06F 17/30321* (2013.01); *G06F 17/30486* (2013.01); *G06F 17/30489* (2013.01); *G06F 17/30584* (2013.01); *G06F 17/30592* (2013.01); *G06F 17/30914* (2013.01)

(58) Field of Classification Search
CPC ............... G06F 17/30; G06F 17/30315; G06F 17/30321; G06F 17/30598; G06F 17/30592; G06F 17/30584; G06F 17/30489
USPC ......................................... 707/737, 609, 722
See application file for complete search history.

(56) References Cited

U.S. PATENT DOCUMENTS

| 6,647,372 B1 * | 11/2003 | Brady ................... G06Q 20/20 705/14.25 |
| 7,653,605 B1 * | 1/2010 | Jackson ............... G06N 99/005 706/20 |
| 9,218,379 B2 * | 12/2015 | Grondin ............ G06F 17/30486 |

* cited by examiner

*Primary Examiner* — Vincent F Boccio
(74) *Attorney, Agent, or Firm* — Amardeep S. Grewal; Reed Smith LLP

(57) ABSTRACT

An apparatus, computer-readable medium, and computer-implemented method for efficiently performing operations on distinct data values, including receiving a query directed to a column of data, the query defining one or more group sets for grouping the data retrieved in response to the query, and for each of the one or more group sets, generating one or more entity map vectors, the length of each entity map vector being equal to the number of unique data values in a domain which corresponds to the column of data, the position of each bit in the entity map vector corresponding to the lexical position of a corresponding unique data value in a lexically ordered list of the unique data values, and the value of each bit in the entity map vector indicating the presence or absence of the corresponding unique data value in the group set.

30 Claims, 18 Drawing Sheets

| Customer Name | Store ID | Amount Spent |
|---|---|---|
| Bill | 1 | 10 |
| Bill | 2 | 5 |
| George | 1 | 11 |
| George | 2 | 11 |
| Max | 2 | 21 |
| Larry | 1 | 31 |
| Larry | 2 | 18 |

Fig. 1A

| Store ID | Count of Visits |
|---|---|
| 1 | 3 |
| 2 | 4 |

Fig. 1B

| Store ID | Amount Spent |
|---|---|
| 1 | 52 |
| 2 | 55 |

Fig. 1C

| Store ID | Average Amount Spent | Count of Visits |
|---|---|---|
| 1 | 17 1/3 | 3 |
| 2 | 13 3/4 | 4 |

Fig. 1D

| Store ID | Minimum Spent |
|---|---|
| 1 | 10 |
| 2 | 5 |

Fig. 1E

| Store ID | Maximum Spent |
|---|---|
| 1 | 31 |
| 2 | 21 |

Fig. 1F

| Store ID | Number of Distinct Customers |
|---|---|
| 1 | 3 |
| 2 | 4 |

Fig. 1G

| TupleId | Week | StoreId | CustId | ProductId | Qty | Spent |
|---|---|---|---|---|---|---|
| 1 | 201001 | 1001 | 167 | 10 | 20 | 200 |
| 2 | 201001 | 1001 | 167 | 12 | 10 | 20 |
| 3 | 201001 | 1001 | 167 | 11 | 10 | 40 |
| 4 | 201001 | 1001 | 167 | 20 | 30 | 30 |
| 5 | 201001 | 1001 | 165 | 11 | 20 | 50 |
| 6 | 201001 | 1001 | 165 | 12 | 20 | 40 |
| 7 | 201001 | 1002 | 268 | 11 | 5 | 30 |
| 8 | 201001 | 1002 | 268 | 20 | 15 | 15 |
| 9 | 201001 | 1002 | 301 | 11 | 10 | 44 |
| 10 | 201002 | 1001 | 167 | 10 | 20 | 200 |
| 11 | 201002 | 1001 | 167 | 12 | 10 | 20 |
| 12 | 201002 | 1001 | 165 | 11 | 10 | 40 |
| 13 | 201002 | 1001 | 301 | 20 | 30 | 30 |
| 14 | 201002 | 1002 | 268 | 11 | 20 | 50 |
| 15 | 201002 | 1002 | 268 | 12 | 20 | 40 |
| 16 | 201002 | 1003 | 167 | 11 | 5 | 30 |
| 17 | 201002 | 1003 | 167 | 20 | 15 | 15 |
| 18 | 201003 | 1001 | 165 | 11 | 10 | 44 |
| 19 | 201003 | 1001 | 165 | 11 | 10 | 40 |
| 20 | 201003 | 1003 | 167 | 20 | 30 | 30 |

Fig. 3A

| D_Week | | D_StoreId | | D_CustId | | D_ProductId | | D_Qty | | D_Spent | |
|---|---|---|---|---|---|---|---|---|---|---|---|
| Eid | Value | Eid | Value | Eid | Value | Eid | Value | Eid | Value | Eid | Value |
| 1 | 201001 | 1 | 1001 | 1 | 165 | 1 | 10 | 1 | 5 | 1 | 15 |
| 2 | 201002 | 2 | 1002 | 2 | 167 | 2 | 11 | 2 | 10 | 2 | 20 |
| 3 | 201003 | 3 | 1003 | 3 | 268 | 3 | 12 | 3 | 15 | 3 | 30 |
| | | | | 4 | 301 | 4 | 20 | 4 | 20 | 4 | 40 |
| | | | | | | | | 5 | 30 | 5 | 50 |
| | | | | | | | | | | 6 | 200 |

Fig. 3B

| TupleId | Week | StoreId | CD_CustId |
|---|---|---|---|
| 1 | 1 | 1 | 2 |
| 2 | 1 | 2 | 2 |
| 3 | 2 | 1 | 3 |
| 4 | 2 | 2 | 1 |
| 5 | 2 | 3 | 1 |
| 6 | 3 | 1 | 1 |
| 7 | 3 | 3 | 1 |

| TupleId | Week | CD_CD_CustId |
|---|---|---|
| 1 | 1 | 1 |
| 2 | 2 | 2 |
| 3 | 3 | 1 |

| TupleId | Week | Sum_CD_CustId |
|---|---|---|
| 1 | 1 | 4 |
| 2 | 2 | 5 |
| 3 | 3 | 2 |

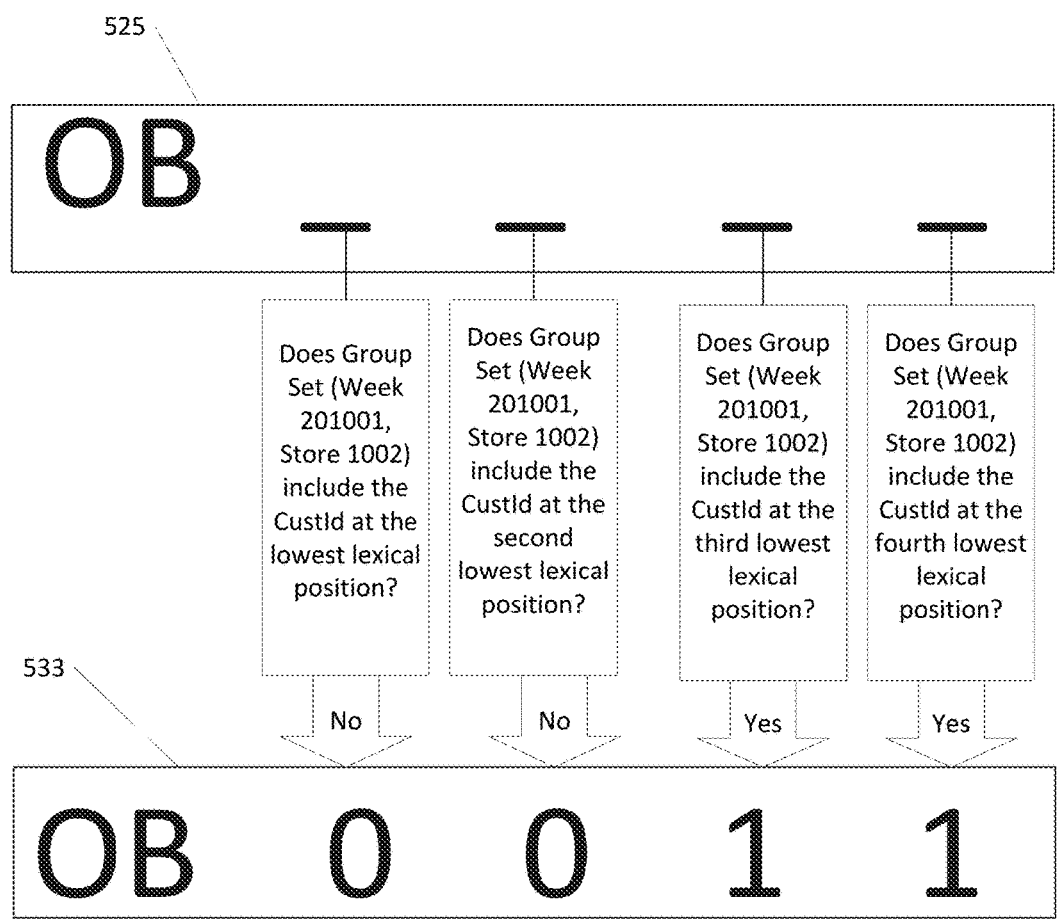

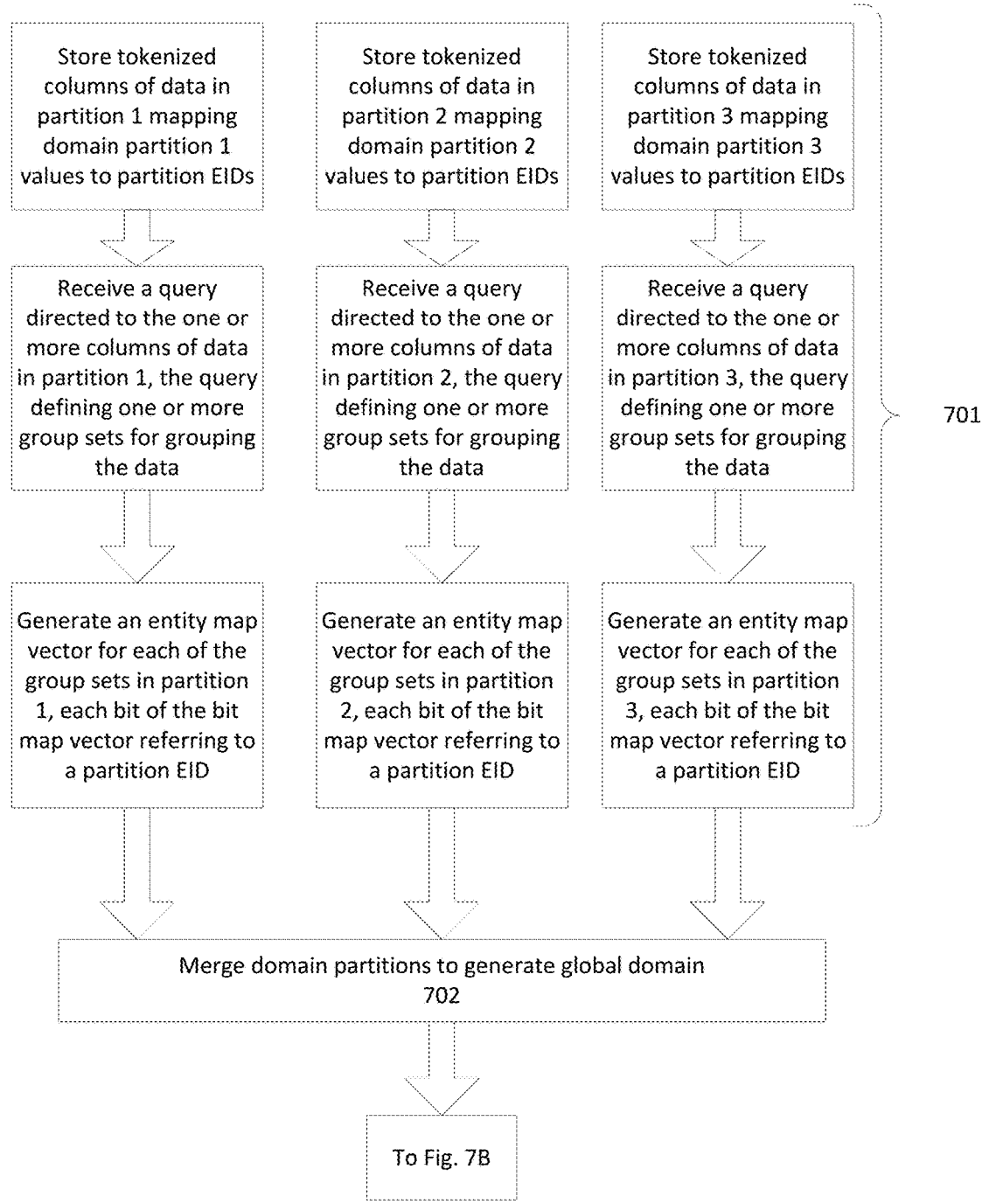

801A 801B 801C

| Partition 1 | Partition 2 | Partition 3 |
|---|---|---|
| D_CustId | D_CustId | D_CustId |
| Eid  Value | Eid  Value | Eid  Value |
| 1    165 | 1    163 | 1    163 |
| 2    167 | 2    167 | 2    165 |
| 3    268 | 3    168 | 3    301 |
| 4    301 | | |

| CustId | CustId | CustId |
|---|---|---|
| 08100 | 08011 | 08101 |
| 08011 | 08101 | 08011 |
| 08101 | 08110 | 08111 |
| 08010 | | |

D_CustId
Eid   Value
 1    163
 2    165
 3    167 — 803
 4    168
 5    268
 804 — 6    301

Fig. 8B 811 812 813

| Partition 1 | | Partition 2 | | Partition 3 | |
|---|---|---|---|---|---|
| Part_Eid | Global_Eid | Part_Eid | Global_Eid | Part_Eid | Global_Eid |
| 1 | 2 | 1 | 1 | 1 | 1 |
| 2 | 3 | 2 | 3 | 2 | 2 |
| 3 | 5 | 3 | 4 | 3 | 6 |
| 4 | 6 | | | | |

Fig. 8C 821 822 823

| Partition 1 | Partition 2 | Partition 3 |
|---|---|---|
| CustId | CustId | CustId |
| 08011000 | 08001100 | 08100001 |
| 08000011 | 08100100 | 08010001 |
| 08011001 | 08101000 | 08110001 |
| 08000010 | | |

Fig. 8D

METHOD, APPARATUS, AND COMPUTER-READABLE MEDIUM FOR EFFICIENTLY PERFORMING OPERATIONS ON DISTINCT DATA VALUES

RELATED APPLICATION DATA

This application is a continuation of application Ser. No. 13/835,590 filed on Mar. 15, 2013 (currently pending), the contents of which are hereby incorporated in their entirety.

BACKGROUND

Enterprises frequently store data in data warehouses. Such data warehouses often have large volumes of data spread out over multiple databases and database tables. Therefore, in order to compile data from the numerous tables and databases, data aggregation techniques must be utilized.

Low Level Aggregate (LLA) tables, which store a summary of data at a lower level, are frequently used to improve the performance of the aggregation process in a data warehouse. In the case of a distributed database stored on multiple partitions, an LLA table can be utilized for each partition and an aggregation process can combine the data from each of the LLA tables to generate an aggregated table for the entire database. Such an aggregation process is known as a roll-up process, and is useful because a higher level of summary can be generated from a lower level of summary (the LLA table), rather than from the source data.

Roll-up processes can be utilized for an aggregate query over multiple data partitions in the context of a Massively Parallel Processing (MPP) database architecture, or to run queries on a partitioned table.

In order to correctly aggregate data from multiple tables during a roll-up process, the underlying function that is being aggregated must additive. For example, if a first table and a second table both have a column corresponding to spending amounts, and a user desires to compute the sum of all the spending amounts in both tables, they can additively aggregate the sum of the spending amounts in first table and the sum of the spending amounts in the second table and arrive at the correct total sum. However, not all functions that users may wish to aggregate in a roll-up process are additive functions.

BRIEF DESCRIPTION OF THE DRAWINGS

FIGS. 1A-1G illustrate a sample database table containing records of visits to stores by customers and some examples of low level aggregation tables generated from the sample database table.

FIGS. 3A-3C are tables illustrating steps for tokenizing one or more columns of data in a table according to a disclosed embodiment.

FIGS. 4A-4C illustrate an LLA table generated from a tokenized table and two sample higher level aggregate tables generated from the LLA table.

FIG. 5C illustrates a table of lexically ordered unique data values in a domain according to a disclosed embodiment.

FIG. 5D illustrates a method of assigning values to each of the bits in the entity map vector according to a disclosed embodiment.

FIGS. 7A-7B illustrate a flowchart for efficiently performing operations on distinct data values in a distributed database by merging domains across multiple partitions according to a disclosed embodiment.

FIGS. 8A-8D illustrate each of steps required to convert a sample set of partition specific entity IDs into global entity IDs according to a disclosed embodiment.

DETAILED DESCRIPTION

Figure 2A:
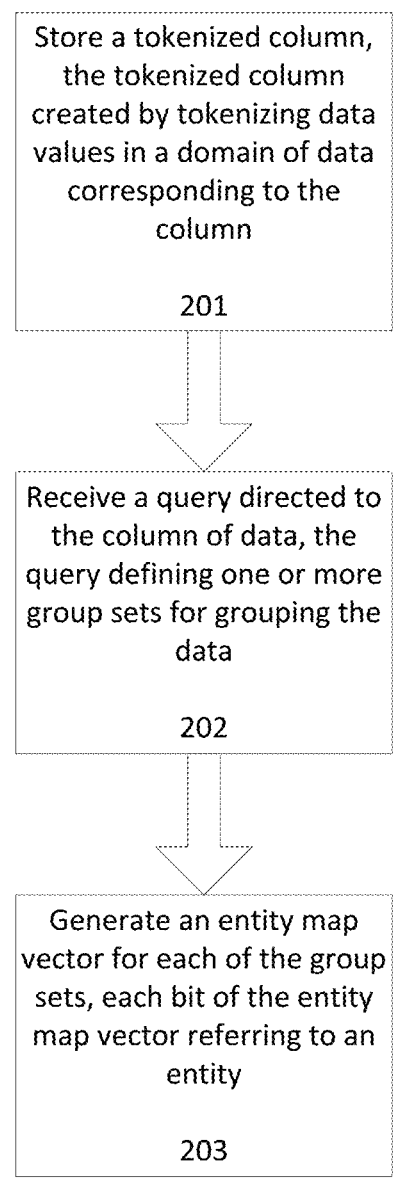
FIGS. 2A-2B are flowcharts of methods for efficiently performing operations on distinct data values according to a disclosed embodiment.

While methods, apparatuses, and computer-readable media are described herein by way of examples and embodiments, those skilled in the art recognize that methods, apparatuses, and computer-readable media for efficiently performing operations on distinct data values are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Some examples of roll-up processes for additive functions will now be discussed with reference to the table in FIG. 1A, which shows a sample database table containing records of visits to stores by customers. The table contains columns for customer name, store ID, and amount spent during the visit.

The query language used throughout this specification is Structured Query Language (SQL), but it is understood that any database query language can be utilized without departing from the scope of this invention, including Contextual Query Language (CQL), XQuery, YQL, Datalog, OQL, RDQL, Multidimensional Expressions (MDX), and many others.

An LLA table of the number of visits to each store is shown in FIG. 1B. The "Count of Visits" column is generated by counting the number of records for each of the stores, resulting in 3 visits for store 1 and 4 visits for store 2. If the user wishes to execute a roll-up process using this table in order to determine the total number of visits to all the stores, the data can be rolled up with the function Sum(Count of Visits), which will result in a total value of 7. In this case, there is no need to go back to the original table to determine the total number of visits to stores.

Similarly, the table in FIG. 1C is an LLA table of the total amount spent at each of the stores. This amount is determined by summing the values in the "Amount Spent" column of the original table for each store. If a user wants to roll-up this table to determine the total amount spent at all stores, they can use the function Sum(Amount Spent) on the LLA table of FIG. 1C to arrive at the correct total amount of 107.

The aggregation of LLA tables during a roll-up process can be accomplished for functions outside of simple sums as well. FIG. 1D shows an LLA table of the average amount spent at each store per visit. This amount is determined by averaging the values in the "Amount Spent" column of the original table for each store. Additionally, the LLA table contains a count of the number of visits to each store as discussed earlier. If a user wants to roll-up this table to determine the average amount spent at all stores, they can use the following function:

$$\text{Average Spent (total)} = \frac{((\text{Avg}_{store1} \times \text{Visits}_{store1}) + (\text{Avg}_{store2} \times \text{Visits}_{store2}))}{\text{Sum(Visits)}}$$

Once again, the roll-up process does not require the original table and can be accomplished using the LLA table alone.

FIGS. 1E and 1F show LLA tables containing the minimum spent at each store and the maximum spent at each store, respectively. To roll-up the table in FIG. 1E to determine minimum amount spent at any store, the user can use the function Min(Minimum Spent) on the LLA table and arrive at the correct answer of 5. Similarly, to roll-up the table in FIG. 1F to determine maximum amount spent at any store, the user can use the function Max(Maximum Spent) on the LLA table and arrive at the correct answer of 31.

Referring now to FIG. 1G, an LLA table is shown which contains a count of the number distinct customers which have visited each store. This can accomplished with a Count(distinct<Customer Name>) function that is grouped by store ID. So, in this case, 3 distinct customers (Bill, George, and Larry) visited store 1 and 4 distinct customers (Bill, George, Max, and Larry) visited store 2.

If a user wished to roll-up the LLA table in FIG. 1G, there would be no way for them to correctly determine the total number of distinct customers that frequented store 1 or store 2 without accessing the underlying main table in FIG. 1A. A count-distinct function run on the distinct customers column of the LLA table would only return a total of 2 distinct values, and a sum would return 7, when the correct number of distinct customers to visit both stores is 4. Similarly, if the LLA table contained a sum of all the distinct dollar amounts spent at each store, and the user wanted to compute the sum of all the distinct dollar amounts spent at all stores, they would have to access the original table, since otherwise the 11 dollars spent at store 1 and the 11 dollars spent at store 2 would be double counted. Additionally, if the LLA table contained an average of all the distinct amounts spent at each store, a roll-up to determine the average of all of the distinct amounts spent at both stores would be unsuccessful and the underlying main table would have to be accessed.

Queries that include non-additive commands, such as count<distinct>, cannot make use of roll-up operations of LLA tables, resulting in much higher computation costs, since these commands must be run on the underlying data. In a partitioned or otherwise distributed database, this cost is magnified because the underlying data must be aggregated or exchanged between partitions in order to retrieve the correct values. For example, if column XYZ is spread out over two partitions, and the user wants to determine the number of distinct values in column XYZ, then all of the values of column XYZ on the first partition must somehow be pooled with all the values of column XYZ on the second partition to determine the number of distinct values.

Applicants have discovered a method and associated data structure, referred to as the Entity Map Vector (EMV), which allows users to use non-additive aggregate functions as additive, thereby allowing roll-up processes to be carried out on LLA tables for functions which would previously have required access to and processing of underlying data in tables at a lower level than the LLA tables. Applicants' technique further allows for the amount of data exchanged between nodes of a partitioned database to be greatly reduced, since LLA tables for each node can be additively aggregated even for non-additive aggregate functions.

Figure 2B:
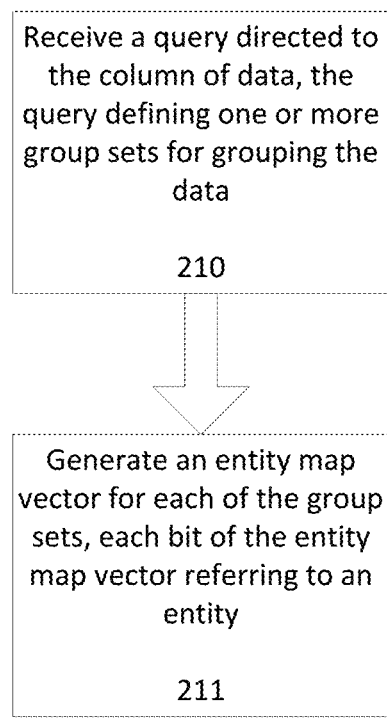

FIG. 2A shows a flowchart of a method for generating an EMV according to a disclosed embodiment. At step 201, a tokenized column of data in a table of a database is stored prior to generating the EMV. This tokenization process is described with reference to FIGS. 3A-3C. Additionally, as shown in FIG. 2B and described later, an EMV can be generated even without a tokenized column of data, based on a lexical ordering of the unique data values in a particular domain.

FIG. 3A shows a table of customer transactions before tokenization 300. The table includes tuple ID 301, and data columns for week 302, store ID 303, customer ID 304, product ID 305, quantity 306, and amount spent 307. Each of the data columns can correspond to an associated domain. For example, a domain containing customer ID's can be used to populate customer ID column of the table shown, but the same domain can be used to populate another table that lists customer ID's with customer addresses. Of course, a domain can also be used to populate multiple columns in the same table. For example, a domain of city names can be used to populate columns in a table corresponding to an origin city and a destination city. So the column for week 302 can correspond to domain D_Week, store ID 303 can correspond to domain D_StoreId, customer ID 304 can correspond to domain D_CustId, product ID 305 can correspond to domain D_ProductId, quantity 306 can correspond to domain D_Qty, and amount spent 307 can correspond to domain D_Spent.

In order to tokenize the data values in each of the data columns, the unique data values that occur in each of the domains (corresponding to the different columns) must be identified and mapped to unique token values. Mapping table 310 in FIG. 3B shows this mapping of unique data values to unique token values for each domain in the table. Each of the unique data values in each of the domains is mapped to a unique token for that domain, referred to as an Entity ID, or EID. So, for example, D_Week 312 contains three unique data values and therefore those three unique data values are mapped to three corresponding unique EIDs. Similarly, D_StoreID 313 also has three unique data values and three EIDs, D_CustId 314 has four unique data values and four EIDs, D_ProductId has four unique data values and four EIDs, D_Qty has five unique data values and five EIDs, and D_Spent has six unique data values and six EIDs.

The mapping tables used to map unique data values in a domain to corresponding EIDs can be stored as a look-up dictionary, so that functions and associated processes can retrieve data values using EIDs if necessary. Additionally, the mapping of unique data values to EIDs is shown as occurring in the lexical order of the unique data values, since this can simplify the assignment process, future data storage, and retrieval, but the assignment of EIDs to unique data values can occur in any order of unique data values. For example, EIDs can be assigned to be assigned to data values in chronological order, so that a first data value encountered before a second data value will have a lower EID.

Figure 3C:
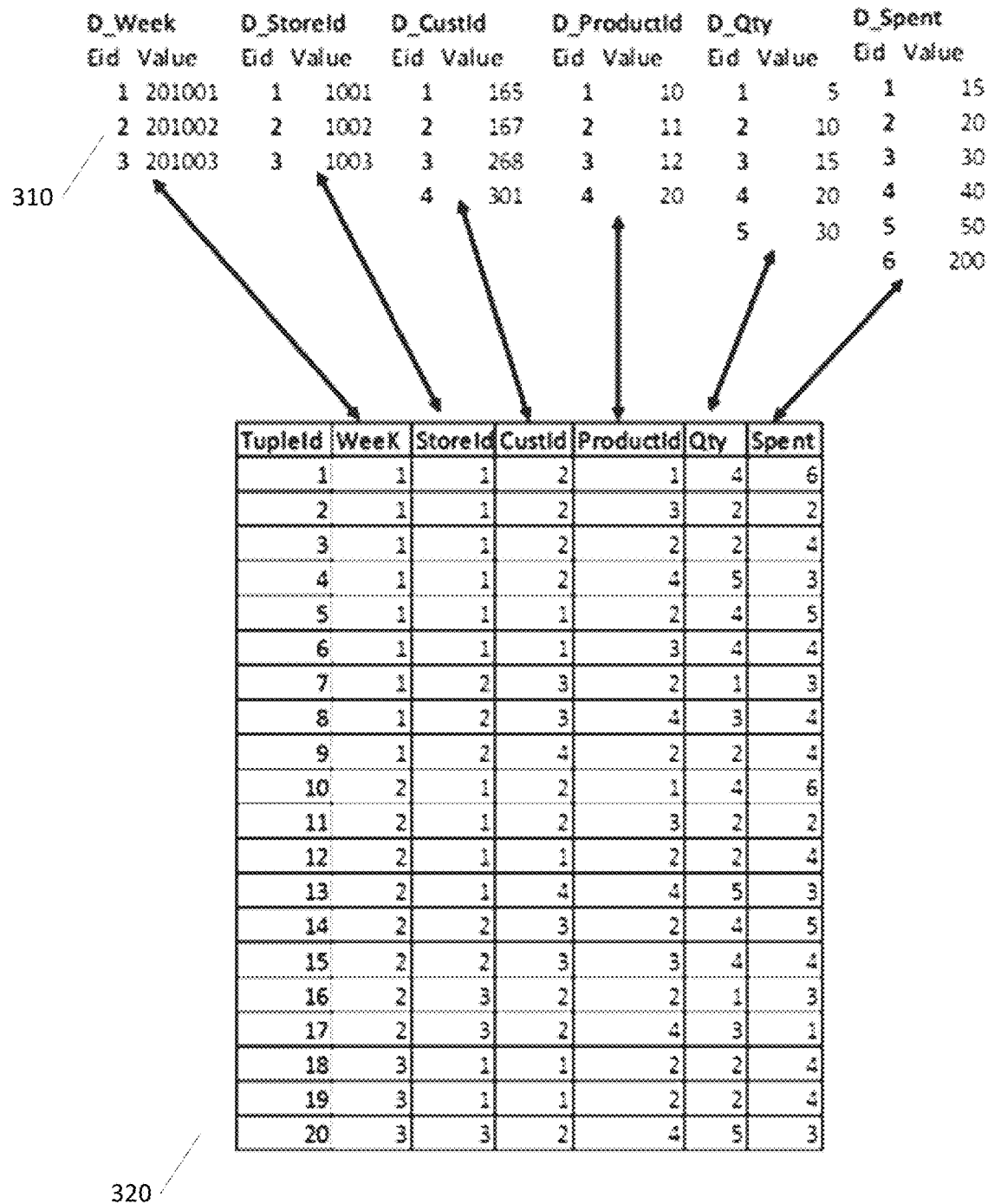

FIG. 3C shows the table of customer transactions after tokenization 320. The EIDs from mapping table 310 have replaced the data values in each of the columns of data. However, even in this advanced encoded structure, any LLA tables generated via from the table 320 will not store data in the proper format to execute roll-up processes involving non-additive (distinct-type) aggregate functions.

For example, an LLA table can be generated based on the transaction table ("Trx") 320 that lists the week, the store ID, and the distinct customers that visit each store each week using the following definition:

```
Create Table LLA_TRX as
Select Week,
       StoreId,
       Count(distinct CustId) as CD_CustId,
From Trx
Group By Week, StoreId;
```

This definition assigns the value corresponding to the distinct customers that visited each store each week to the column CD_CustId. Additionally, the "group by" command creates group sets corresponding to week-store ID pairs. For example, group set 1(week 1, store 1), group set 2 (week 1, store 2), and so on. Any arrangement or number of group sets are possible. For example, the group sets can be based on a single column, or two or more columns.

Referring to FIG. 4A, the resulting LLA_TRX table 400 is shown. The table accurately represents the number of distinct customers per group set. For example, the table correctly lists the number of distinct customers that visited store 1 in week 1 as two, or the number of distinct customers that visited store 1 in week 2 as three.

If a user tried to roll-up the table LLA_TRX for each week to list the number of distinct customers that visited any of the stores each week, they would be unable to produce a correct count of the number of distinct customers for each group set, the group sets in this case being group 1(week 1), group 2(week 2), and so on. For example, if the following definition was used to create a higher level LLA table:

```
Create Table LLA_TRX_WEEK as
Select Week,
       Count(distinct CD_CustId) as CD_CD_CustId,
From LLA_Trx
Group By Week;
```

Then the resulting table, shown as Table 410 in FIG. 4B, would incorrectly list the number of distinct customers that visited any of the stores each week. Similarly, if a sum function was used to aggregate the table LLA_TRX:

```
Create Table LLA_TRX_WEEK as
Select Week,
       Sum(distinct CD_CustId) as Sum_CD_CustId,
From LLA_Trx
Group By Week;
```

Then the resulting table, shown in FIG. 4C, would also incorrectly list the number of distinct customers that visited any of the stores each week. For example, the number of distinct customers in week 2, based on the table 320 in FIG. 3C, is 4 (custId's 1, 2, 3 and 4), but the table 410 in FIG. 4B lists 2 and the table in FIG. 4C 420 lists 5.

As discussed earlier, this is because the aggregation of distinct values is non-additive. In order to determine the correct values for the number of distinct customers per week, it is necessary to return to the original data table, making the LLA_TRX table useless for non-additive aggregation queries.

The EMV data structure generated according to a disclosed embodiment solves this problem by storing the distinct values of each group set efficiently, and in a way that allows them to be aggregated. Returning to FIG. 2A, at step 202, a special query can be received which specifies one or more group sets and includes a new function, or other similar command, which is used to generate the EMV data structure. At step 203, the computing system can generate one or more entity map vectors. Of course, steps 201, 202, and 203 can be executed in a different order. For example, a query can first be received (step 202), then the tokenized column of data can be stored (step 201), and then one or more entity map vectors can be generated (step 203).

To facilitate steps 202-203, a new SQL function count (Additive_distinct<Column Name>) can be defined to instruct the computing system to produce an EMV for each group set, instead of a value. An EMV can be a bit map vector, with each bit mapped to a different entity. By storing the information relating to the distinct values in a group set in an EMV, each distinct value, referred to as an entity, can be mapped to one bit of a bit map vector. So using the earlier example of the tokenized transactions table (Trx) 320 in FIG. 3C, the following definition can be used to generate the LLA table LLA_TRX:

```
Create Table LLA_TRX as
Select Week,
       StoreId,
       Count(Additive_distinct CustId) as CD_CustId,
From Trx
Group By Week, StoreId;
```

Figures 5A, 5B:
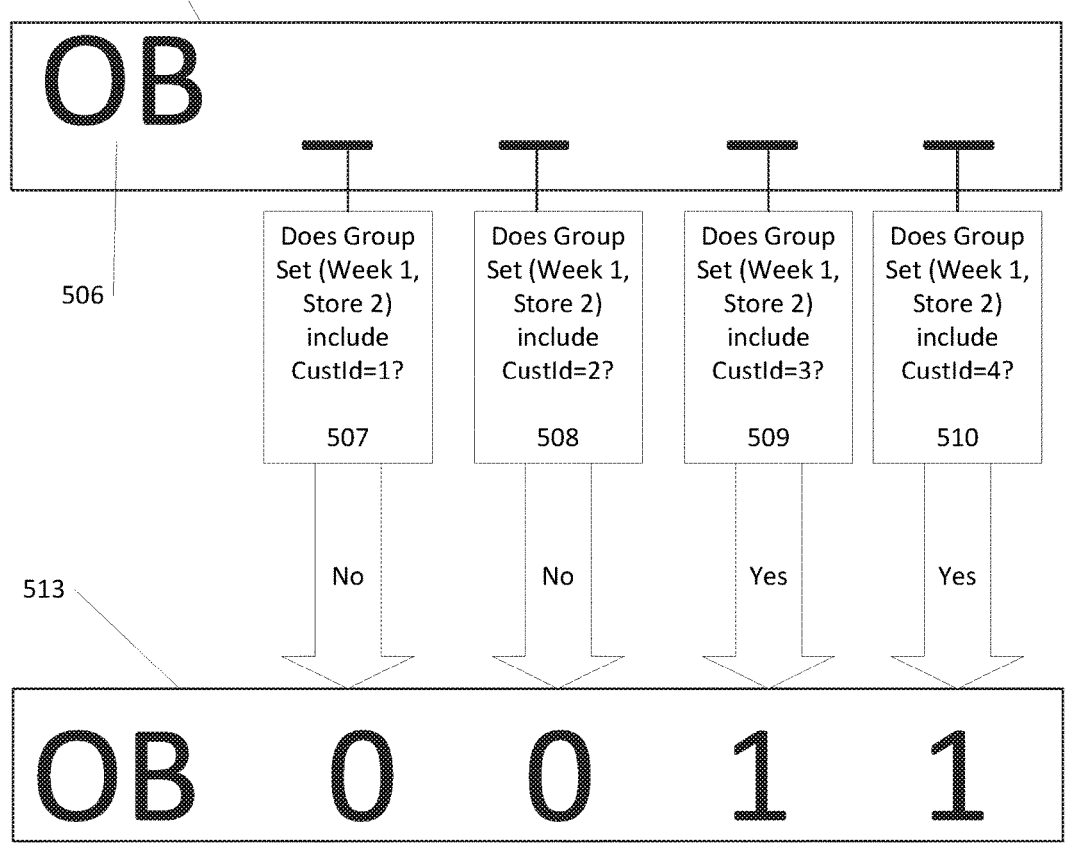
FIG. 5A illustrates an LLA table generated from a tokenized table which utilizes the entity map vector data structure according to a disclosed embodiment.
FIG. 5B illustrates a method of assigning values to each of the bits in the entity map vector according to a disclosed embodiment.

FIG. 5A shows the resulting LLA_TRX table 500. As in the previous LLA_TRX table, the tuple ID 501 corresponding to each group set, week 502, store ID 503, and count of distinct customers 504 are stored. However, rather than storing the count of distinct customers as a numeral, the distinct customers for each group set are stored in an EMV with each bit referring to different EID and the value of the bit indicating the presence or absence that EID in the group set.

Of course, an SQL extension, such as Additive_distinct, is not required to instruct the computing system to produce an EMV for each group set. For example, the database engine can detect the creation of a table with a column that involves an aggregation function of distinct data values, such as Count (distinct<Column Name>), and automatically build an EMV to store the count of distinct data values. This allows the EMV structure to be utilized with existing front end tools.

The structure of an EMV will now be described with respect to the second EMV 513 corresponding to the group set (week 1, store ID 2). Referring to FIG. 5B, an empty EMV 505 is shown. Lead characters 506 serve only to label the EMV as a bit map vector and can be any suitable characters or can be omitted. The length dimension of the EMV 505 is the number of bit slots and does not include any lead characters. The length of EMV is equal to the total number of EIDs in the domain of the column that is used to generate the EMV. In other words, the length of the EMV is equal to the number of unique values in the domain which is being used to generate the EMV. So, for example, the domain used to generate the EMVs for table 500 in FIG. 5A is the D_CustId domain, and from FIG. 3B we see that the D_CustId domain has 4 EIDs. Therefore the length of the EMVs for that domain will have a length of 4, with 4 corresponding bit slots.

Referring back to FIG. 5B, each of the bit slots corresponds to a different EID, in the order that the EIDs are assigned. So the first slot corresponds to EID=1, the second slot corresponds to EID=2, and so on. To determine the value of the bit in each of the bit slots in an EMV, the group set corresponding to the EMV is checked to see whether it contains the EID value. So for the first bit in EMV 513, it is determined whether the group set (week 1, store 2) includes a CustId=1 at step 507. From table 320 in FIG. 3C we can see that a CustId=1 does not appear in during week 1 at store 2. Therefore the value of the first bit is 0.

In a similar manner, for the second bit in EMV 513, it is determined whether the group set (week 1, store 2) includes a CustId=2 at step 508. Since CustId=2 also does not appear during week 1 at store 2, the value of the second bit is also zero. For the third bit in EMV 513, it is determined whether the group set (week 1, store 2) includes a CustId=3 at step 509. From table 320 we see that CustId=3 appears twice during week 1 at store 2. Therefore the value of the third bit is equal to 1. For the fourth bit in EMV 513, it is determined whether the group set (week 1, store 2) includes a CustId=4 at step 510. Since a CustId=4 also appears during week 1 at store 2, the fourth bit is also set to 1. The resulting EMV 513 captures the distinct customers that visited store 2 during week 1 in a format that allows for additive aggregation.

If a user wanted to determine the number of distinct customers per group set, all they would have to do is sum each of the bits in the EMV for that group set. For example, the EMV for group set (week 1, store 1) is OB1100, so the total number of distinct customers is 1+1+0+0=2. The EMV for group set (week 2, store 1) is OB1101 so the total number of distinct customers for that group set is 1+1+0+1=3.

Referring back to FIG. 2B, a method for generating EMVs from a non-tokenized data column will now be described. Step 210 is similar to step 202 of FIG. 2A, in that a query is received which specifies one or more group sets and includes a new extension, or other similar command, which instructs the database engine to generate the EMV data structure. At step 211, an entity map vector is generated for each of the group sets, based on the lexical ordering of the unique data values in the domain corresponding to the column of data. FIGS. 5C and 5D illustrate this process in greater detail with regard to an EMV generated for the group set (week 201001, store 1002) in the non-tokenized table 300 in FIG. 3A. Table 520 shows the unique data values in the domain CustId, arranged in lexical order. The EMV generation process shown in FIG. 5D uses this lexical ordering to bypass the step of generating EIDs. As shown in empty EMV 525, the length of each of the EMVs generated is equal to the number of unique data values in the domain. In this case, since there are four unique data values in the domain CustId, the length of the EMVs generated for a particular group set will be four. The position of each of the bits in each EMV corresponds to the lexical position of a corresponding unique data value in the lexically ordered list of unique data values 520 and the value of each bit in the EMV indicates the presence or absence of the corresponding unique data value in the group set. So for the first bit in EMV 533, it is determined whether the group set (week 201001, store 1002) includes the CustId which is at the lowest lexical position. This CustId is 165, and from table 300 in FIG. 3A, we see that this CustId does not occur in the group set (week 201001, store 1002), so the bit is equal to zero. Similarly, the second bit of EMV 533 refers to the unique data value with the second lowest lexical position, which is 167, and also does not occur in the group set, resulting in a zero for the bit. The third bit of EMV 533 refers to the unique data value with the third lowest lexical position, which is 268, and we see from table 300 in FIG. 3A that this value does occur in the group set (week 201001, store 1002), so the third bit is set to 1. Similarly, the value corresponding to the fourth bit, 301, also occurs in the group set, so the fourth bit is set to 1. This results in the same EMV that was generated in FIG. 5B, but which can be generated from a non-tokenized column of data.

Figures 6A, 6B:
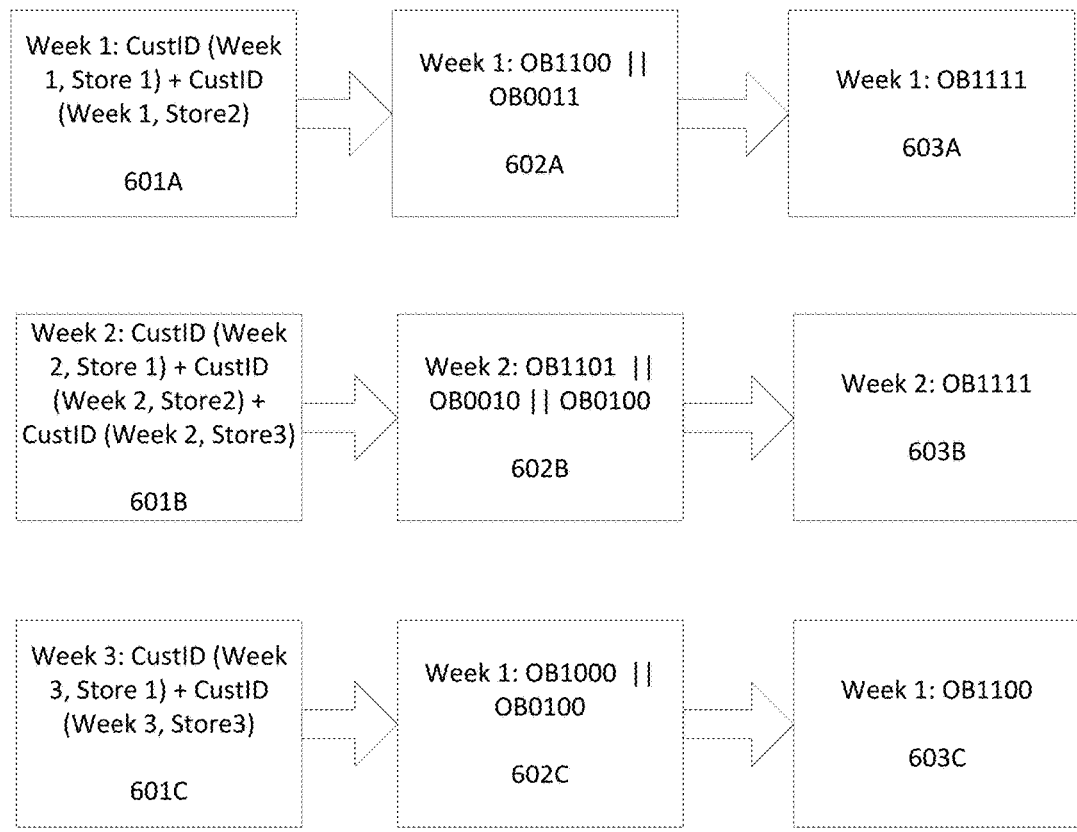
FIG. 6A illustrates the steps involved in carrying out a roll-up process on the entity map vectors stored in the LLA table of FIG. 5A according to a disclosed embodiment.
FIG. 6B illustrates the higher level table that is the result of the roll-up process shown in FIG. 6A.

Unlike the previous examples of LLA tables which do not utilize the entity map vector, LLA tables with EMVs can be correctly aggregated during a roll-up process. For example, the following definition can be used to generate a higher level table for the number of distinct customers that visited any of the stores from the LLA table, grouped by week:

Create Table LLA_TRX_WEEK as
Select Week,
    Count(Distinct CD_CustId) as EMV_CD_CustId,
From LLA_Trx
Group By Week;

Referring to FIG. 6A, the process for aggregating the bit vectors across stores and grouping by week is shown. Each of the group sets which must be aggregated is determined for each week in steps 601A, 601B, and 601C. For example, the group sets that must be combined for week 1 are the CustId's corresponding to group sets week 1, store 1 and week 1, store 2. The group sets that must be combined for week 2 are the CustId's corresponding to group sets week 2, store 1, week 2, store 2, and week 2, store 3. The group sets that must be combined for week 3 are the CustId's corresponding to group sets week 3, store 1 and week 3, store 3.

Referring to steps 602A, 602B, and 602C, the EMVs for each of the group sets that must be combined for each week are aggregated using a Boolean OR. So, for example, if two EMVs are being combined with a Boolean OR and only the first EMV has a "1" in the first position, then the resulting EMV will have a "1" in the first position.

The resulting combined EMVs are shown in steps 603A, 603B, and 603C. Each EMV corresponds to a different week group set. As discussed earlier, the count of distinct customers in each week can be determined by summing all of the bits in each of the EMVs.

FIG. 6B shows the resulting table 600 with the tuple ID 601 for each group set, the week number 602, and the count of distinct customers 603 based on the combined EMVs from FIG. 6A. By referring to the original table 320 in FIG. 3C, we can see the count of distinct customers 603 in table

600 correctly indicates that 4 distinct customers (1,2,3, and 4) went to any of the stores in week 1, 4 distinct customers (1,2,3, and 4) went to any of the stores in week 2, and 2 distinct customers (1 and 2) went to any of the stores in week 3.

Of course, aggregation of non-additive aggregate functions is not limited to counting the number of distinct elements in a group set. If a user wishes to sum a set of distinct values in a particular group set or average a set of distinct values in a group set, that can be accomplished by looking up the unique data values corresponding to each bit of the EMV in the look-up dictionary and adding it to the sum or including it in the average if the bit is "1." Additionally, the look-up dictionary can be used to retrieve each of the unique data values corresponding to the bits in the entity map vector for any other purpose, such as customized calculations or metrics. In situations where the entity map vectors are generated from non-tokenized data values based on the lexical ordering of the unique data values, that same lexical ordering relationship can be used to retrieve the unique data values corresponding to each bit. For example, if the first bit in an EMV is a "1," then the unique data value with the lowest lexical position can be included in a sum, average, or other calculation involving the data values in the set. Similarly, if the second bit in an EMV is a "0," then the unique data value corresponding to the second lowest lexical position can be left out of the sum, average, or other calculation.

An overview of query processing in a partitioned database and a process for EMV based representation of data in a partitioned database will now be described. Given a three partition database containing a transaction table, a logical view of that table can be presented as a View:

```
Create View V1 as
Select * from Partition1.TRX
Union All
Select * from Partition2.TRX
Union All
Select * from Partition3.TRX
```

Table partitioning enables efficient distributed parallel processing of requests, with the exception of non-additive aggregate functions. For example, if an original query for a transaction table named TRX similar to table 300 in FIG. 3A is "Select Week, Sum(Spent) from TRX group by Week," but the table is distributed over three partitions, the query can be transformed into the distributed request:

```
Select Week, Sum(P_Spent) from (
    Select Week, Sum(Spent) as P_Spent from Partition1.TRX group
    by Week
    Union All
    Select Week, Sum(Spent) as P_Spent from Partition2.TRX group
    by Week
    Union All
    Select Week, Sum(Spent) as P_Spent from Partition3.TRX group
    by Week
    ) T
Group By Week
```

For that distributed request, each query segment, like "Select Week, Sum(Spent) as P_Spent from Partition1.TRX group by Week" can be executed independently and their intermediate result set could be appended together and finally reprocessed to produce the final query result.

In the case of a non-additive aggregate function request, such as "Select Week, Count(Distinct CustId) from TRX group by Week," the request can be transformed into the distributed request:

```
Select Week, Count(Distinct CustId) from (
    Select Week, CustId from Partition1.TRX group by Week, CustId
    Union All
    Select Week, CustId from Partition2.TRX group by Week, CustId
    Union All
    Select Week, CustId from Partition3.Trx group by Week, CustId
    ) T
Group By Week
```

The distributed request in this case does preserve the list of unique CustIds from each partition, but can require a huge amount of data to be exchanged between each of the partitions and subsequently processed. For example, the list of CustIds in the first partition for the first week will have to be compared to the list of CustIds in the second partition for the first week to determine if there is any overlap. As a result, such a distributed request introduces a bottlenecking of the request execution process.

The method to transform a non-additive aggregate function to an additive one can be applied to one or more partitioned databases to reduce the amount of data exchanged between partitions and improve performance. For example, the original query "Select Week, Count(Distinct CustId) from TRX group by Week" can be transformed to:

```
Select Week, Count(Distinct CustId) from
(
Select Week, Count(Additive_distinct CustId) CustId from
Partition1.TRX group by Week
    Union All
Select Week, Count(Additive_distinct CustId) CustId from
Partition2.TRX group by Week
    Union All
Select Week, Count(Additive_distinct CustId) CustId from
Partition3.Trx group by Week
) T
Group By Week
```

Figure 7B:
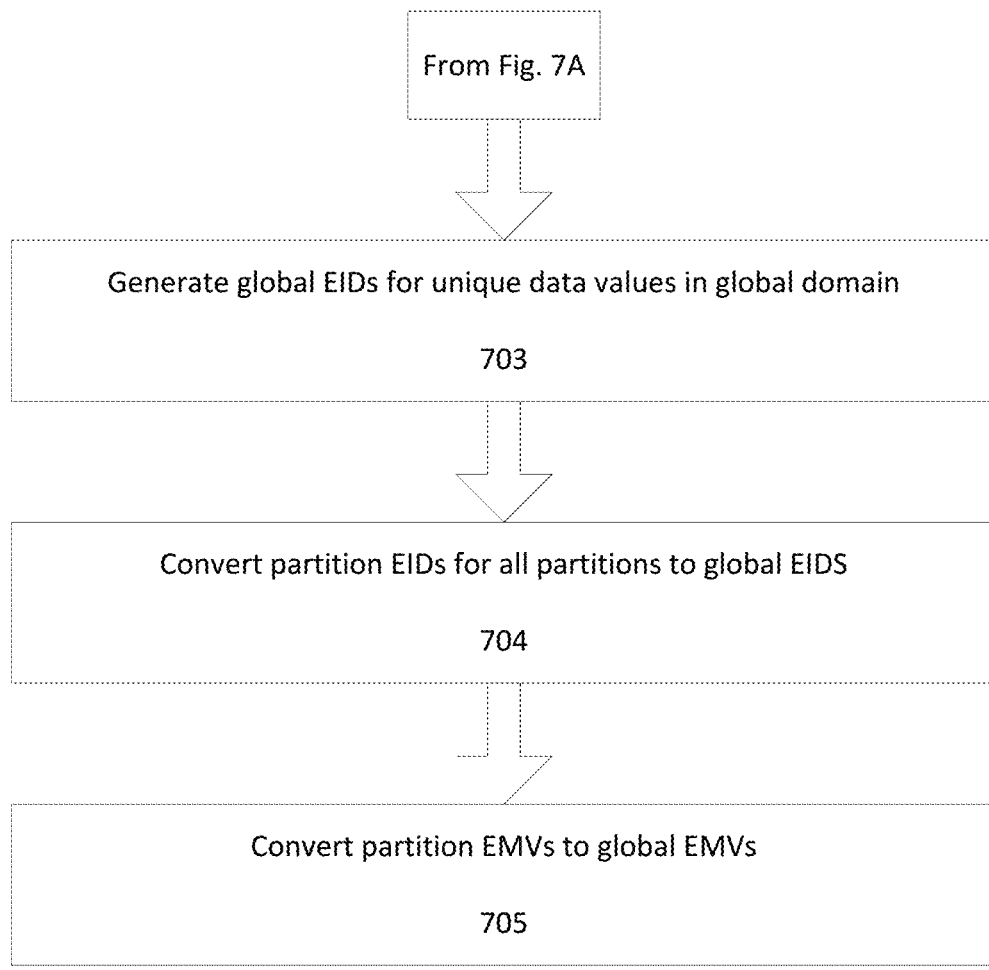

FIG. 7A illustrates the steps for processing this distributed request according to a disclosed embodiment. The first three steps 701 can be performed in parallel for each of the partitions and are similar to the steps for generating an EMV shown in FIG. 2A, applied to each partition. Of course, these steps do not need to be performed in parallel and can be performed in any suitable order. After the first three steps 701 are executed for each of the partitions, the result will be three sets of EMVs, one for each partition, with each digit of the EMVs referring to local partition EIDs. For example, FIG. 8A shows three hypothetical EMV sets 802A, 802B, and 802C, corresponding to the three partitions, along with three hypothetical EID mapping tables 801A, 801B, and 801C, for each of the unique data values in each of the partitions. Since the EIDs in the mapping tables 801A-801C all correspond to different unique data values, and since the number of EIDS in each partition varies, the length of the EMVs and significance of the bits in each of the EMVs in EMV sets 802A-802C varies. As a result, the EMV sets 802A-802C cannot be combined by the union operator in their present state.

Referring back to FIG. 7A, at step 702, a domain merge process is carried out to build a global domain from each of the domain partitions so that the EMV sets can be standardized. Continuing to FIG. 7B, at step 703 global EIDs are generated for each of the unique data values in the global domain. Since the global EIDs correspond to the same unique data values as the partition EIDs, each of the partition EIDs can be converted into global EIDs at step 704 of FIG. 7B. At step 705, the partition specific EMVs are converted into global EMVs, all of which will have the same length and will reference the same unique data values at each bit. This is accomplished by using a partition-to-global EID mapping table to rebuild each of the EMVs created in the partition to create new ones which map to the global EIDs For an illustration of this process, FIG. 8B shows a global domain 803 that results from a domain merge of the domain partitions in FIG. 8A and the corresponding global EIDs 804. FIG. 8C shows the partition-to-global EID mapping tables for partition 1 811, partition 2, 812 and partition 3, 813. As discussed earlier, the partition-to-global EID mappings are generated by cross referencing a unique data value with its partition EID and global EID. This mapping table is then used to convert the partition specific EMVs to global EMVs. The resulting global EMVs generated from conversion are shown in FIG. 8D for partition 1 821, partition 2 822, and partition 3 823.

Once the partition specific EMVs have been converted to global EMVs, they can be aggregated as discussed earlier with a Boolean OR. The resulting combined global EMVs will indicate the presence or absence of unique data values in a particular group set across all of the combined partitions. Additionally, the sum of the bits in a combined global EMV will equal the total number of distinct data values in the group set corresponding to that EMV across partitions.

This domain merge process can be utilized for database update operations. In data warehouse environments, the update process often comprises appending new data. By processing the appended data as a new partition to generate an associated partition LLA table and then combining the partition LLA table with existing LLA tables using the techniques discussed above, the new data can merged with existing LLA tables.

Figure 9:
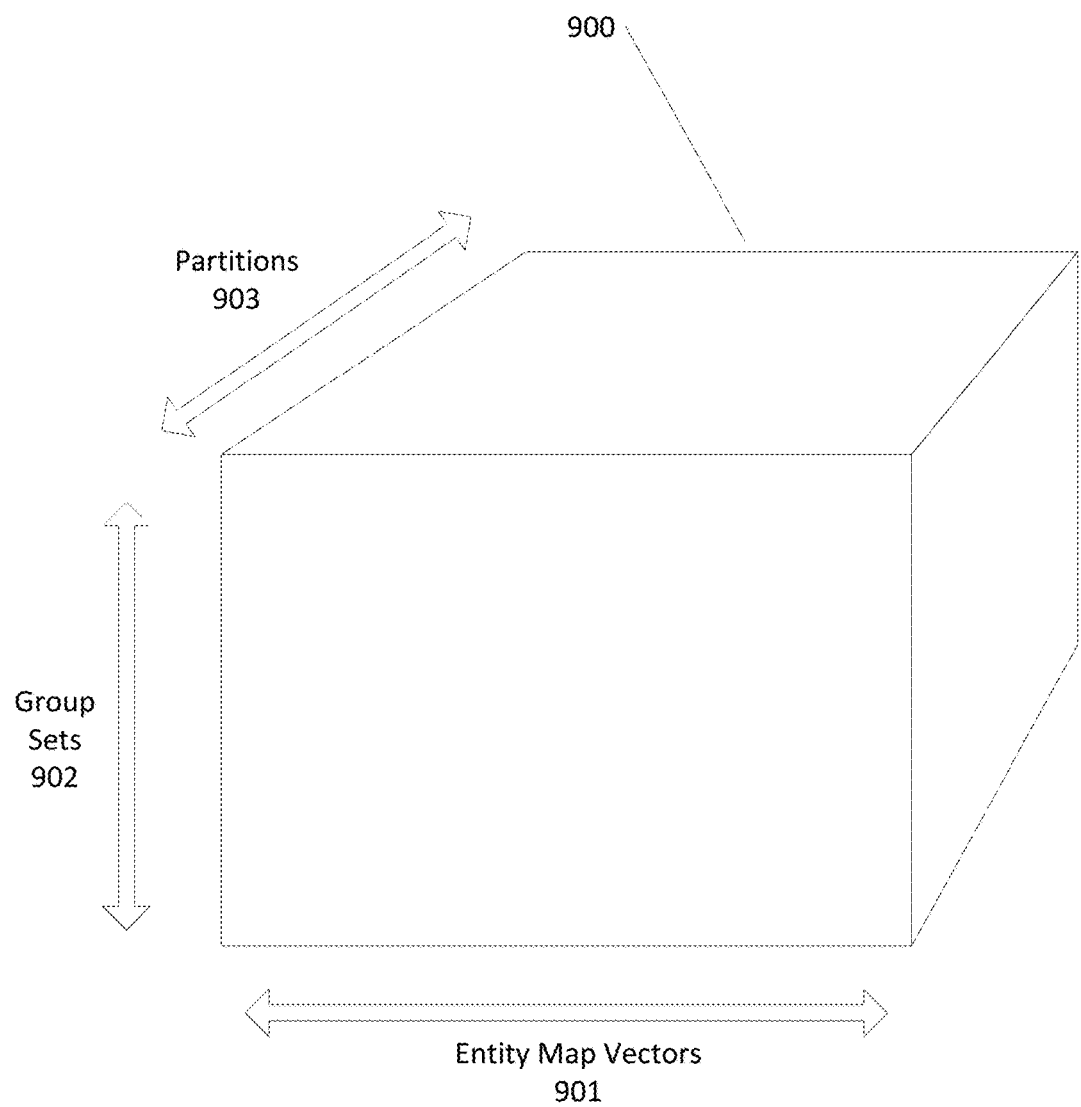
FIG. 9 illustrates a data cube for storing global entity map vectors across multiple partitions according to a disclosed embodiment.

For example, the global EMVs for each of the partitions can be stored in a data cube. FIG. 9 shows an exemplary data cube 900 storing the global EIDs according to a disclosed embodiment. As shown, the dimensions can include an EMV dimension 901, a group set dimension 902, and a partition dimension 903. When a new data update is received, it can be treated as a partition and added to the data cube using the domain merge processes discussed above.

Figure 10:
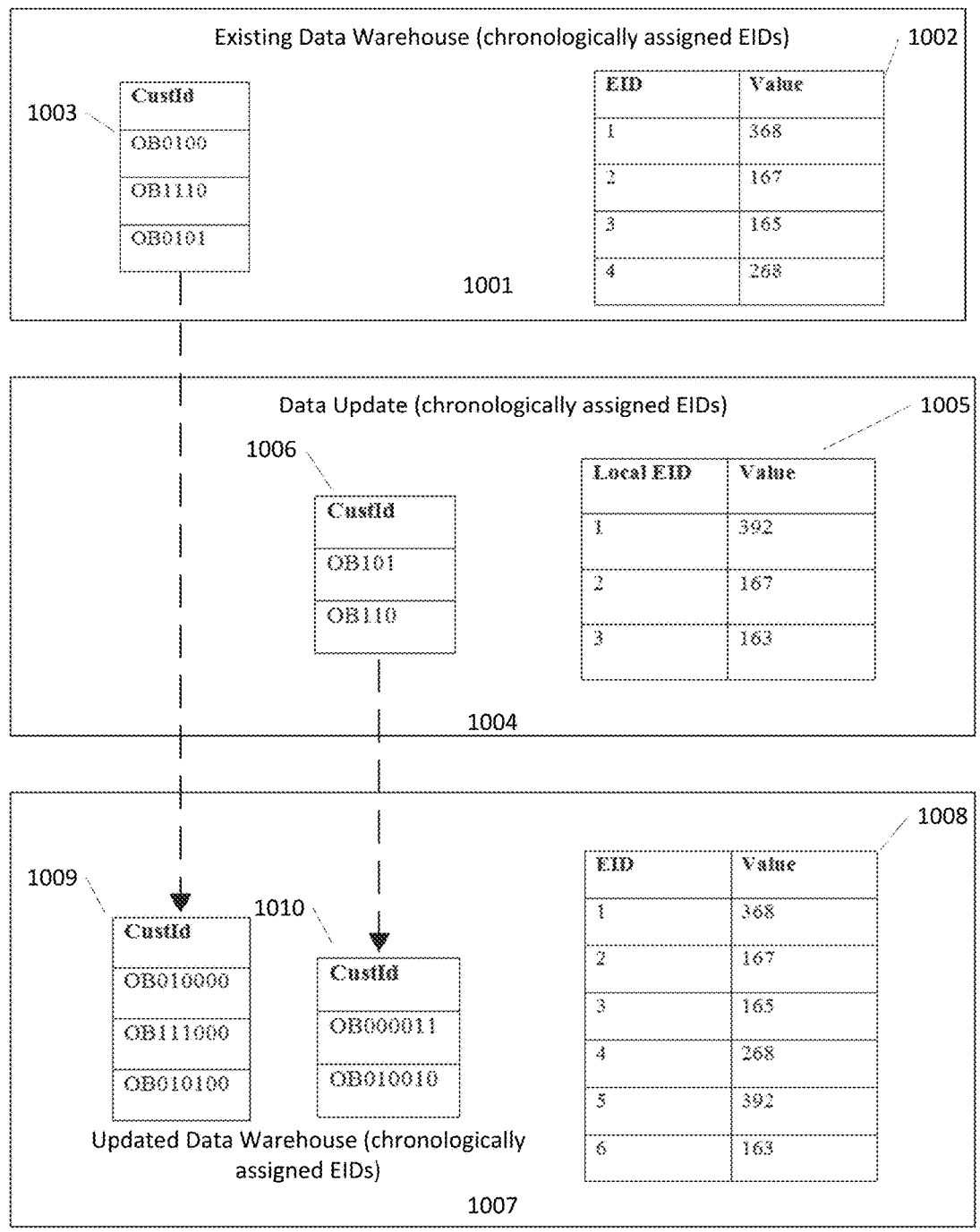
FIG. 10 illustrates a database warehouse update operation using chronologically assigned entity IDs according to a disclosed embodiment.

As discussed earlier, EIDs may also be assigned in chronological order of appearance of the data values, rather than lexical order of the data values. By assigning EIDs in this manner, the domain merge step for an update to a data warehouse may be eliminated. Referring to FIG. 10, an existing data warehouse is shown at 1001. In this example, the chronological order in which the data values are processed is used to assign the EIDs for each data value. The table 1002 shows the EIDs for four data values processed in the following sequence: 368, 167, 165, 268. Additionally, table 1003 shows the EMVs for three group sets which contain data values. So, for example, the second EMV "OB1110" corresponds to a group set which contains the data values 368, 167, and 165.

FIG. 10 also shows a data update 1004 for the data warehouse. The data update is similar to the earlier discussed partitions. A local EID mapping table 1005 shows the EIDs for the data values in the update, also assigned in chronological order. Additionally, the EMVs for two group sets are shown at 1006. In this case, two of the data values in the update are new, with one of the data values already existing in the data warehouse.

The updated data warehouse is shown at 1007. Since the EIDs are assigned in chronological order, there is no need to perform a domain merge process. Rather, the two new data values in the data update, 392 and 163, are assigned the next two available EIDs, 5 and 6 in this case. Since there is no remapping of existing EIDs, the existing table of EMVs 1003 can be updated simply by extending the length of each EMV by adding a number of zeroes equal to the number of new EIDs to the end of each EMV. This results in table 1009 with the updated EMVs. Of course, the zeroes do not necessarily need to be appended to the EMVs, as the absence of a character at a particular position can be interpreted as a zero.

The only remapping that is required for a data update when the EIDs are assigned based on chronological order of the data values is to the EMVs in the actual data update. In this case, the EMVs in update 1006 must be remapped to use the global EID table 1008 rather than the local EID table 1005 to generate the updated EMVs in table 1010. So, for example, since the first EMV in the update 1006 corresponds to a group set that includes the values 392 and 163 (1's at the first and third position of the EMV), and the global EIDs corresponding to those data values are 5 and 6, the first EMV in the updated data table 1010 corresponding to the first EMV in the data update will have 1's at the fifth and sixth positions.

In the scenario where one or more partition-specific EMVs are generated from a non-tokenized column of data in a first data partition and a merge is carried out with one or more other partitions, the first domain partition corresponding to the non-tokenized column of data in the first data partition can be combined with one or more other domain partitions in the set of domain partitions to generate a global domain. This global domain can be used to generate one or more global EMVs corresponding to the one or more partition-specific EMVs based on the lexical ordering of all of the unique data values in the global domain, similar to the process of generating an EMV described with regards to FIG. 2B. The length of each global EMV can be equal to the number of unique data values in the global domain, the position of each bit in a global EMV can correspond to the lexical position of a corresponding unique data value in a lexically ordered list of the unique data values in the global domain, and the value of each bit in a global EMV can indicate the presence or absence of the corresponding unique data value in a group set.

Figure 11A:
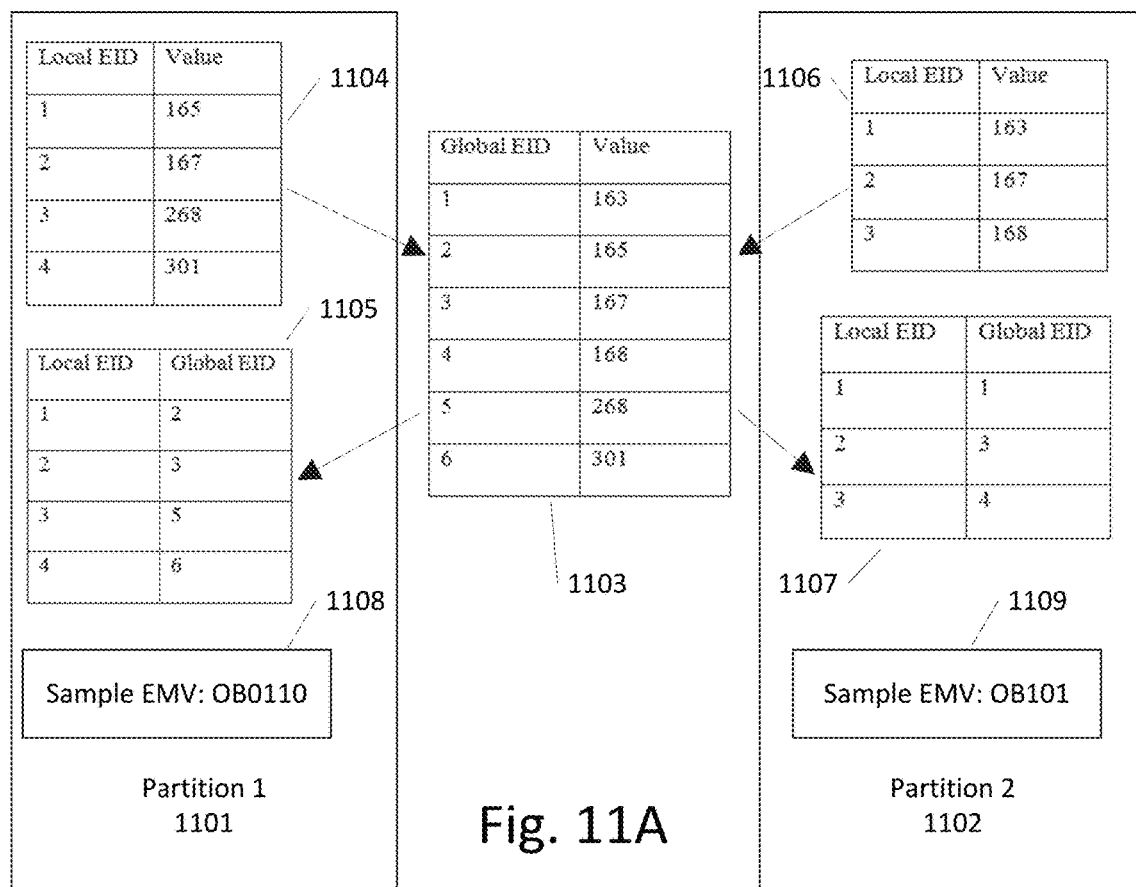
FIG. 11A illustrates domain synchronization data structures and process flow according to a disclosed embodiment.

A domain synchronization process will now be described which can be used to bypass the domain merge process described earlier, and which can make operation of a database in distributed system more efficient. FIG. 11A shows two partitions, 1101 and 1102, in a distributed database. Similar to the distributed database of FIG. 8A, each of the partitions includes a local EID table, with table 1104 for partition 1101 and table 1106 for partition 1102. In this example, the EIDs are shown as being assigned based upon lexical order of the data values, but the EIDs can also be assigned chronologically, as discussed earlier. Additionally, the distributed database includes a global EID table 1103. Global EID table 1103 contains mappings of all of the data values to global EIDs. Once again, these global EIDs are assigned based upon lexical order of data values, but can be assigned based upon chronological order of data values. Although global EID table 1103 is shown as being stored outside of partition 1101 and partition 1102, the global EID table can be stored on one or both of the partitions as well.

Each of the partitions, 1101 and 1102, also includes a local EID-to-global EID mapping table, table 1105 for partition 1101 and table 1107 for partition 1102. These mapping tables can be used to translate local EMVs to global EMVs, as will be discussed later using the examples of EMVs 1108 and 1109.

When an update is received at either partition 1101 or partition 1102, any new unique data values can be sent to the global EID table 1103. These new unique data values can be used to update the global EID table. For example, when the EIDs are assigned by lexical order of the unique data values, the data values in the global EID table 1103 can be re-sorted and the global EIDs can be reassigned to each of the unique data values taking into account the new unique data values received. Note that if chronologically assigned EIDs are used, this process is greatly simplified, as new unique data values will be assigned the next available EID, and there is no need to reassign EIDs to all of the preexisting unique data values.

After the global EID table 1103 is updated, any new global EIDs can be propagated back to the partitions 1101 and 1102. The new global EIDs can be used to update each of the local EID-to-global EID mapping tables, 1105 and 1107. Once again, chronologically assigned EIDs are more efficient for this process, as the only new global EIDs will be for the new unique data values, whereas with lexically assigned EIDs, all of the EIDs for existing unique data values can potentially be reshuffled.

Figure 11B:
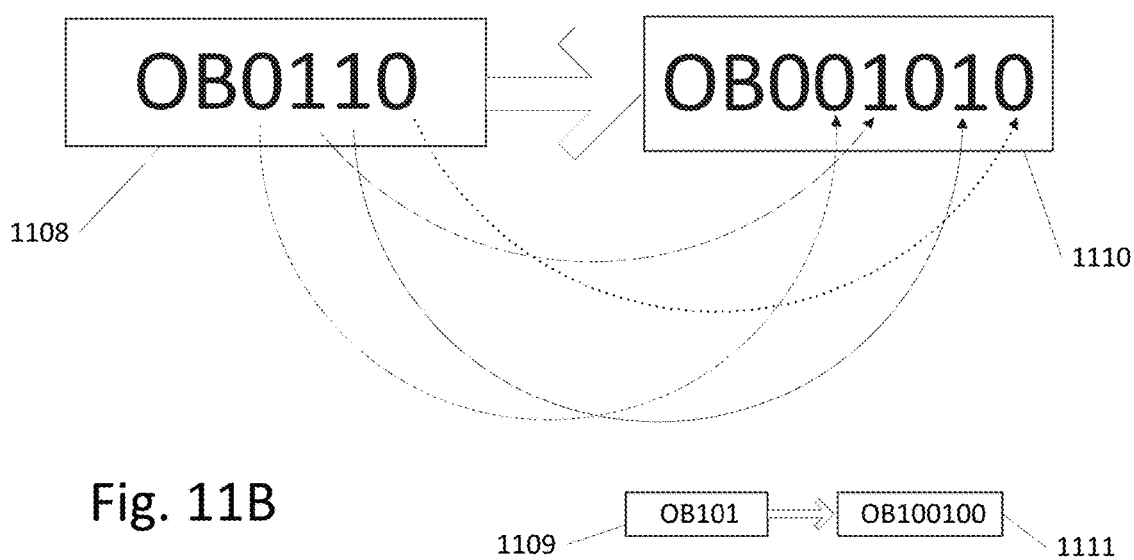
FIG. 11B illustrates the mapping of local entity map vectors to a global entity map vectors using a mapping table.

When a query requires EMVs from more than one partition, the local EID-to-global EID mapping tables, 1105 and 1107, can be used to convert any local EMVs to global EMVs. Referring to FIG. 11B, the conversion process is shown for sample EMV 1108 in partition 1101. As shown in FIG. 11B, each bit in the local EMV is mapped from its local position to its global position in the equivalent global EMV 1110. So, for example, since the local EID-to-global EID mapping table 1105 maps local EID "3" to global EID "5," the value of the bit at the third position in the local EMV 1108 is assigned to the fifth position of the global EMV 1110. If there is no mapping for a position in the global EMV, such as for the fourth position in global EMV 1110, then that value can be set to zero to reflect the absence of the particular unique data value in the group set, since if that value was present it would be in the local EID-to-global EID mapping table 1105. Similarly, local EID-to-global EID mapping table 1107 can be used to generate global EMV 1111 from local EMV 1109 in partition 1102.

Through this domain synchronization process, the domain merge procedure described earlier can be bypassed, resulting in processing time improvement, and reducing the number of unique data values that need to be exported at one time. Of course, a single EMV is shown in each partition for the sake of clarity only. In practice, if a local EID and value existed in a particular partition, then some group set and EMV would have to contain that value. Additionally, two partitions are shown for the sake of clarity only, and the database can contain any number of partitions.

Figure 12:
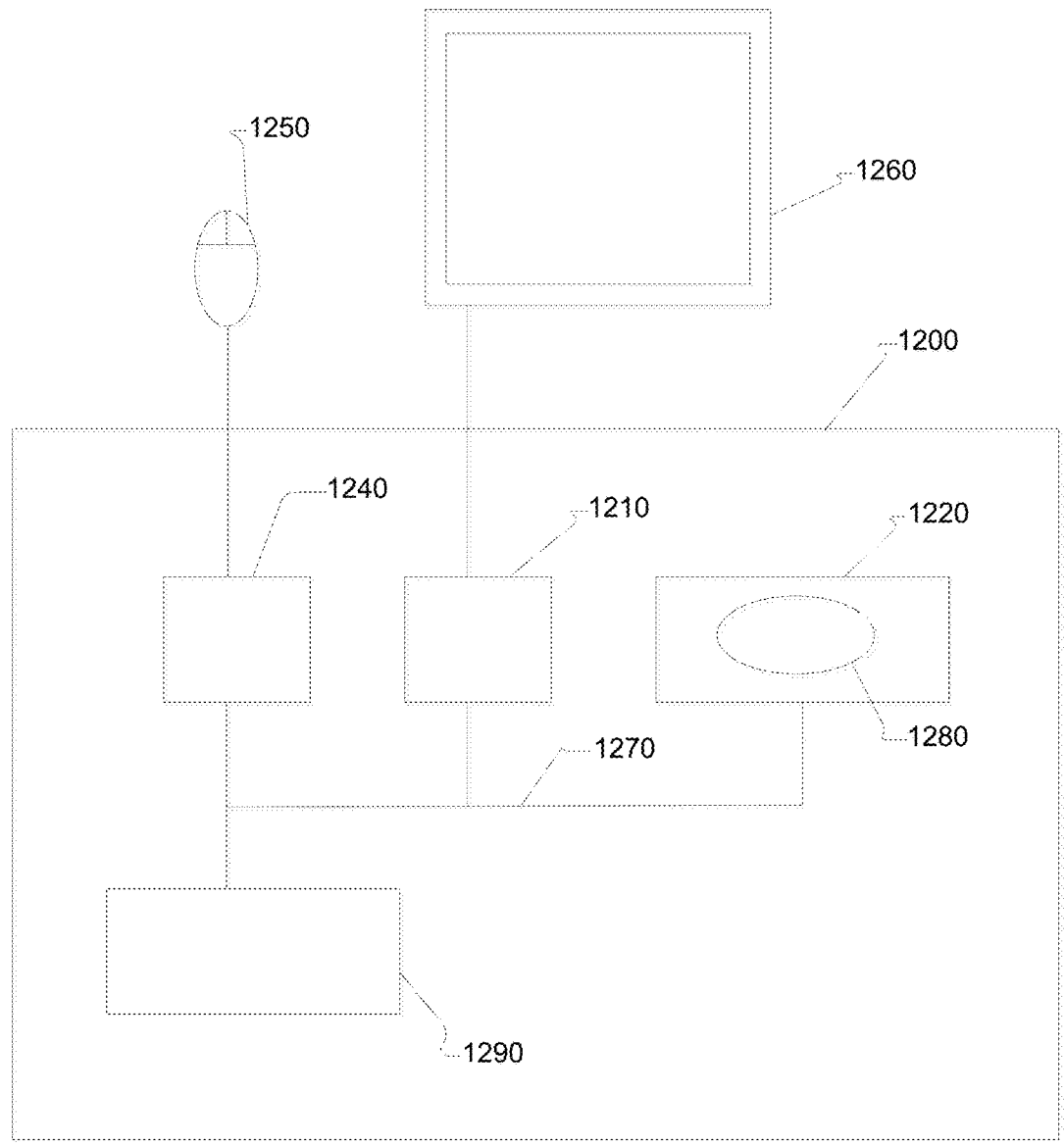
FIG. 12 illustrates an exemplary computing environment that can be used to carry out the method for efficiently performing operations on distinct data values according to a disclosed embodiment.

One or more of the above-described techniques can be implemented in or involve one or more computer systems. FIG. 12 illustrates a generalized example of a computing environment 1200. The computing environment 1200 is not intended to suggest any limitation as to scope of use or functionality of a described embodiment.

With reference to FIG. 12, the computing environment 1200 includes at least one processing unit 1210 and memory 1220. The processing unit 1210 executes computer-executable instructions and can be a real or a virtual processor. In a multi-processing system, multiple processing units execute computer-executable instructions to increase processing power. The memory 1220 can be volatile memory (e.g., registers, cache, RAM), non-volatile memory (e.g., ROM, EEPROM, flash memory, etc.), or some combination of the two. The memory 1220 can store software 1280 implementing described techniques.

A computing environment can have additional features. For example, the computing environment 1200 includes storage 1240, one or more input devices 1250, one or more output devices 1260, and one or more communication connections 1290. An interconnection mechanism 1270, such as a bus, controller, or network interconnects the components of the computing environment 1200. Typically, operating system software or firmware (not shown) provides an operating environment for other software executing in the computing environment 1200, and coordinates activities of the components of the computing environment 1200.

The storage 1240 can be removable or non-removable, and includes magnetic disks, magnetic tapes or cassettes, CD-ROMs, CD-RWs, DVDs, or any other medium which can be used to store information and which can be accessed within the computing environment 1200. The storage 1240 can store instructions for the software 1280.

The input device(s) 1250 can be a touch input device such as a keyboard, mouse, pen, trackball, touch screen, or game controller, a voice input device, a scanning device, a digital camera, remote control, or another device that provides input to the computing environment 1200. The output device(s) 1260 can be a display, television, monitor, printer, speaker, or another device that provides output from the computing environment 1200.

The communication connection(s) 1290 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1200, computer-readable media include memory 1220, storage 1240, communication media, and combinations of any of the above.

Of course, FIG. 12 illustrates computing environment 1200, display device 1260, and input device 1250 as separate devices for ease of identification only. Computing environment 1200, display device 1260, and input device 1250 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1200 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

What is claimed is:

1. A method executed by one or more computing devices for efficiently performing operations on distinct data values, the method comprising:
    receiving, by at least one of the one or more computing devices, a query directed to a column of data in a table, the column of data corresponding to a domain of a database, and the query defining one or more group sets for grouping the data retrieved in response to the query, wherein each group set in the one or more group sets corresponds to a unique group of one or more values associated with one or more other domains of the database; and
    generating, by at least one of the one or more computing devices, an entity map vector for each group set in the one or more group sets by identifying any values in the column of data which are present in any rows of the table which include the unique group of one or more values corresponding to the group set, wherein:
        a length of each entity map vector is equal to a number of unique data values in the domain corresponding to the column of data,
        a position of each bit in each entity map vector corresponds to a lexical position of a corresponding unique data value in a lexically ordered list of the unique data values, and
        a value of each bit in each entity map vector indicates a presence or absence of the corresponding unique data value in the group set.

2. The computer-implemented method of claim 1, wherein a value of "1" for a bit in an entity map vector indicates the presence of a unique data value in the group set, and a value of "0" for a bit in an entity map vector indicates the absence of the unique data value in the group set.

3. The computer-implemented method of claim 1, wherein the number of distinct data values in any group set is equal to the sum of the values of each of the bits of the entity map vector corresponding to that group set.

4. The computer-implemented method of claim 1, wherein the one or more group sets comprise a plurality of group sets, the method further comprising:
    receiving, by at least one of the one or more computing devices, a command to aggregate the data from two or more of the group sets into a combined group set; and
    performing, by at least one of the one or more computing devices, a Boolean OR operation on the entity map vectors corresponding to the two or more group sets to generate a combined entity map vector.

5. The computer-implemented method of claim 4, wherein the number of distinct data values in the combined group set is equal to the sum of the values of each of the bits of the combined entity map vector.

6. The computer-implemented method of claim 1, wherein the table is partitioned and distributed over a plurality of computing nodes, and wherein the column of data is a first column partition in a set of column partitions, the domain is a first domain partition in a set of domain partitions, and the one or more entity map vectors are one or more first partition entity map vectors, the method further comprising:
    combining, by at least one of the one or more computing devices, the first domain partition with one or more other domain partitions in the set of domain partitions to generate a global domain; and
    generating, by at least one of the one or more computing devices, one or more global entity map vectors corresponding to the one or more first partition entity map vectors, wherein:
        the length of each global entity map vector is equal to the number of unique data values in the global domain;
        the position of each bit in the global entity map vector corresponds to the lexical position of a corresponding unique data value in a lexically ordered list of the unique data values in the global domain; and
        the value of each bit in the entity map vector indicates the presence or absence of the corresponding unique data value in the group set.

7. The computer-implemented method of claim 6, further comprising:
    performing, by at least one of the one or more computing devices, a Boolean OR operation on the one or more global entity map vectors corresponding to the first partition and one or more second global entity map vectors corresponding to a second partition to generate one or more combined global entity map vectors.

8. The computer-implemented method of claim 7, wherein the sum of the values of each of the bits of each of the combined global entity map vectors is the total number of distinct elements in a particular group set corresponding to that global entity map vector across the first partition and the second partition.

9. The computer-implemented method of claim 1, wherein the number of group sets is determined, at least in part, by the number of distinct data values in a second column of data in the table.

10. The computer-implemented method of claim 1, wherein the group sets are defined in reference to one or more second columns of data in the table.

11. An apparatus for efficiently performing operations on distinct data values, the apparatus comprising:
    one or more processors; and
    one or more memories operatively coupled to at least one of the one or more processors and having instructions stored thereon that, when executed by at least one of the one or more processors, cause at least one of the one or more processors to:

receive a query directed to a column of data in a table, the column of data corresponding to a domain of a database, and the query defining one or more group sets for grouping the data retrieved in response to the query, wherein each group set in the one or more group sets corresponds to a unique group of one or more values associated with one or more other domains of the database; and generate an entity map vector for each group set in the one or more group sets by identifying any values in the column of data which are present in any rows of the table which include the unique group of one or more values corresponding to the group set, wherein:

a length of each entity map vector is equal to a number of unique data values in the domain corresponding to the column of data, a position of each bit in each entity map vector corresponds to a lexical position of a corresponding unique data value in a lexically ordered list of the unique data values, and a value of each bit in each entity map vector indicates a presence or absence of the corresponding unique data value in the group set.

12. The apparatus of claim 11, wherein a value of "1" for a bit in an entity map vector indicates the presence of a unique data value in the group set, and a value of "0" for a bit in an entity map vector indicates the absence of the unique data value in the group set.

13. The apparatus of claim 11, wherein the number of distinct data values in any group set is equal to the sum of the values of each of the bits of the entity map vector corresponding to that group set.

14. The apparatus of claim 11, wherein the one or more group sets comprise a plurality of group sets and wherein the one or more memories have further instructions stored thereon, that, when executed by at least one of the one or more processors, cause at least one of the one or more processors to:

receive a command to aggregate the data from two or more of the group sets into a combined group set; and perform a Boolean OR operation on the entity map vectors corresponding to the two or more group sets to generate a combined entity map vector.

15. The apparatus of claim 14, wherein the number of distinct data values in the combined group set is equal to the sum of the values of each of the bits of the combined entity map vector.

16. The apparatus of claim 11, wherein the table is partitioned and distributed over a plurality of computing nodes, wherein the column of data is a first column partition in a set of column partitions, the domain is a first domain partition in a set of domain partitions, and the one or more entity map vectors are one or more first partition entity map vectors, and wherein the one or more memories have further instructions stored thereon, that, when executed by at least one of the one or more processors, cause at least one of the one or more processors to:

combine the first domain partition with one or more other domain partitions in the set of domain partitions to generate a global domain; and generate one or more global entity map vectors corresponding to the one or more first partition entity map vectors, wherein:

the length of each global entity map vector is equal to the number of unique data values in the global domain;

the position of each bit in the global entity map vector corresponds to the lexical position of a corresponding unique data value in a lexically ordered list of the unique data values in the global domain; and the value of each bit in the entity map vector indicates the presence or absence of the corresponding unique data value in the group set.

17. The apparatus of claim 16, wherein the one or more memories have further instructions stored thereon, that, when executed by at least one of the one or more processors, cause at least one of the one or more processors to:

perform a Boolean OR operation on the one or more global entity map vectors corresponding to the first partition and one or more second global entity map vectors corresponding to a second partition to generate one or more combined global entity map vectors.

18. The apparatus of claim 17, wherein the sum of the values of each of the bits of each of the combined global entity map vectors is the total number of distinct elements in a particular group set corresponding to that global entity map vector across the first partition and the second partition.

19. The apparatus of claim 11, wherein the number of group sets is determined, at least in part, by the number of distinct data values in a second column of data in the table.

20. The apparatus of claim 11, wherein the group sets are defined in reference to one or more second columns of data in the table.

21. At least one non-transitory computer-readable medium storing computer-readable instructions that, when executed by one or more computing devices, cause at least one of the one or more computing devices to:

receive a query directed to a column of data in a table, the column of data corresponding to a domain of a database, and the query defining one or more group sets for grouping the data retrieved in response to the query, wherein each group set in the one or more group sets corresponds to a unique group of one or more values associated with one or more other domains of the database; and generate an entity map vector for each group set in the one or more group sets by identifying any values in the column of data which are present in any rows of the table which include the unique group of one or more values corresponding to the group set, wherein:

a length of each entity map vector is equal to a number of unique data values in the domain corresponding to the column of data, a position of each bit in each entity map vector corresponds to a lexical position of a corresponding unique data value in a lexically ordered list of the unique data values, and a value of each bit in each entity map vector indicates a presence or absence of the corresponding unique data value in the group set.

22. The at least one non-transitory computer-readable medium of claim 21, wherein a value of "1" for a bit in an entity map vector indicates the presence of a unique data value in the group set, and a value of "0" for a bit in an entity map vector indicates the absence of the unique data value in the group set.

23. The at least one non-transitory computer-readable medium of claim 21, wherein the number of distinct data values in any group set is equal to the sum of the values of each of the bits of the entity map vector corresponding to that group set.

24. The at least one non-transitory computer-readable medium of claim 21, wherein the one or more group sets comprise a plurality of group sets and wherein the at least one non-transitory computer-readable medium further comprises additional instructions that, when executed by one or more computing devices, cause at least one of the one or more computing devices to:
receive a command to aggregate the data from two or more of the group sets into a combined group set; and
perform a Boolean OR operation on the entity map vectors corresponding to the two or more group sets to generate a combined entity map vector.

25. The at least one non-transitory computer-readable medium of claim 24, wherein the number of distinct data values in the combined group set is equal to the sum of the values of each of the bits of the combined entity map vector.

26. The at least one non-transitory computer-readable medium of claim 21, wherein the table is partitioned and distributed over a plurality of computing nodes, wherein the column of data is a first column partition in a set of column partitions, the domain is a first domain partition in a set of domain partitions, and the one or more entity map vectors are one or more first partition entity map vectors, and wherein the at least one non-transitory computer-readable medium further comprises additional instructions that, when executed by one or more computing devices, cause at least one of the one or more computing devices to:
combine the first domain partition with one or more other domain partitions in the set of domain partitions to generate a global domain; and
generate one or more global entity map vectors corresponding to the one or more first partition entity map vectors, wherein:
the length of each global entity map vector is equal to the number of unique data values in the global domain;
the position of each bit in the global entity map vector corresponds to the lexical position of a corresponding unique data value in a lexically ordered list of the unique data values in the global domain; and
the value of each bit in the entity map vector indicates the presence or absence of the corresponding unique data value in the group set.

27. The at least one non-transitory computer-readable medium of claim 26, the at least one non-transitory computer-readable medium further comprising additional instructions that, when executed by one or more computing devices, cause at least one of the one or more computing devices to:
perform a Boolean OR operation on the one or more global entity map vectors corresponding to the first partition and one or more second global entity map vectors corresponding to a second partition to generate one or more combined global entity map vectors.

28. The at least one non-transitory computer-readable medium of claim 27, wherein the sum of the values of each of the bits of each of the combined global entity map vectors is the total number of distinct elements in a particular group set corresponding to that global entity map vector across the first partition and the second partition.

29. The at least one non-transitory computer-readable medium of claim 21, wherein the number of group sets is determined, at least in part, by the number of distinct data values in a second column of data in the table.

30. The at least one non-transitory computer-readable medium of claim 21, wherein the group sets are defined in reference to one or more second columns of data in the table.

* * * * *